May 29, 1956  L. LAUBENDER  2,747,953
PISTON ARRANGEMENT FOR INTERNAL COMBUSTION ENGINES
Filed April 12, 1954
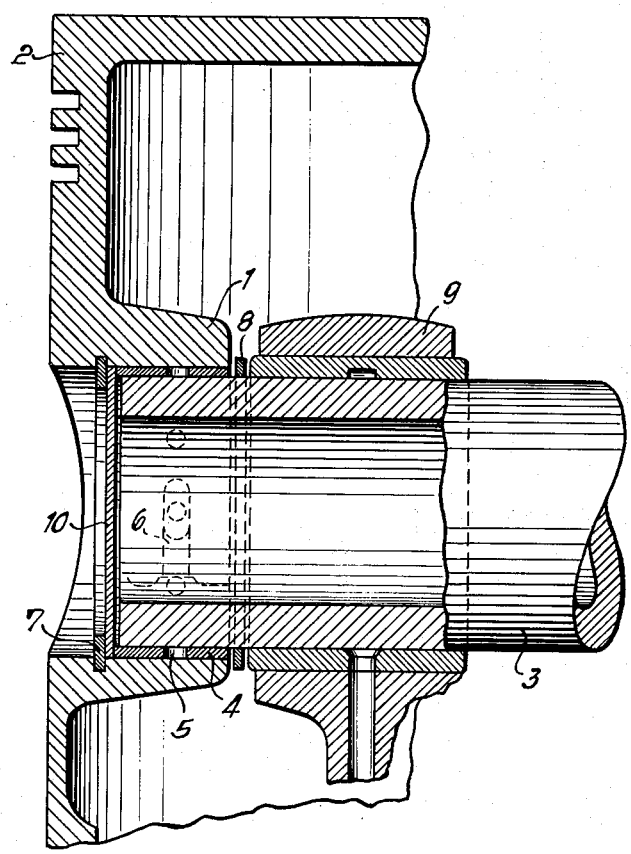
INVENTOR:
LUDWIG LAUBENDER
BY:

United States Patent Office 2,747,953
Patented May 29, 1956

2,747,953

PISTON ARRANGEMENT FOR INTERNAL COMBUSTION ENGINES

Ludwig Laubender, Kassel, Germany, assignor to Krauss-Maffei Aktiengesellschaft, München-Allach, Germany Application April 12, 1954, Serial No. 422,565

Claims priority, application Germany May 19, 1953

10 Claims. (Cl. 309—19)

The present invention relates to internal combustion engines and more particularly to piston arrangements for such engines.

In two-stroke internal combustion engines, such as, for example, a two-stroke diesel engine, the pressure forces acting on each piston are concentrated at only one side of the openings thereof into which the wrist pin extends. Thus, the wear on the wrist pin is concentrated at a very small part thereof which gives rise to uneven wearing away of the wrist pin and eventually to undesirable escape of lubricant and to faulty operation. This problem has long been recognized, and has been solved in a more or less satisfactory manner by arranging the wrist pins so that they are freely rotatable, and in this way the wear on the wrist pins is distributed about the entire periphery of their end portions. However, the one sided pressure applied to the pistons in the two-stroke engines is still present and provides an uneven wearing away of the bearings of the wrist pins, even though the latter are evenly worn. It is almost impossible to prevent this undesirable result in known engines, and it is further impossible to provide uniform wearing of the bearing sleeves located at opposite ends of the wrist pin. Up to the present time only exceedingly complicated constructions have been provided to attempt to overcome these drawbacks, and none of the known constructions operate in a fully satisfactory manner.

One of the objects of the present invention is to overcome the above drawbacks with a single bearing sleeve located about each end of the wrist pin in a piston.

A further object of the present invention is to provide an exceedingly simple arrangement which will not only distribute the wear on the bearing sleeves, but will also provide substantially uniform wear of both bearing sleeves which are respectively located at opposite ends of the wrist pin.

Another object of the present invention is to provide a means for efficiently lubricating the bearing sleeves of the present invention.

An additional object of the present invention is to provide a simple means for limiting axial displacement of the bearing sleeves of the present invention.

A still further object of the present invention is to provide a simple means for preventing lubricant from gaining access to the outer piston surfaces from the bearing sleeves.

With the above objects in view the present invention mainly consists of a piston for an internal combustion engine, this piston having opposed side wall portions each of which is formed with an opening passing therethrough. A bearing sleeve is freely turnably arranged in each of these openings and consists of a material softer than the material of the piston itself. A wrist pin extends between the openings of the piston and has opposite end portions respectively freely turnably arranged in the bearing sleeves, and a means is provided for limiting axial displacement of these bearing sleeves with respect to the piston and wrist pin.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawing.

Although, only one side of a piston is shown in the drawing, it is to be understood that the opposite side thereof is constructed in exactly the same way.

Referring now to the drawing, which is a fragmentary sectional view of a piston constructed in accordance with the present invention and which shows only enough structure to afford a clear understanding of the invention, it will be seen that the piston 2 is formed in opposed side wall portions thereof with a cylindrical opening 1 and that opposite end portions of the wrist pin 3 extend into these openings 1. In accordance with the present invention a single bearing sleeve 4 is located about each end portion of the wrist pin 3 in the opening 1 of piston 2. Each bearing sleeve 4 consists not only of a material softer than the material of the wrist pin 3, which is usually made of steel, but also of a material softer than the material of piston 2, which is usually made of cast iron. For example, each bearing sleeve 4 may be made of bronze, so that the different metals which slidably engage each other provide a very favorable sliding action.

In order to lessen the wear on the bearing sleeves 4, each of the latter is formed with a plurality of apertures 5 evenly distributed about its axis and located in a plane which passes centrally and transversely through the bearing sleeve.

In this plane there is also located the bores 6 formed in the piston 2 for leading the lubricant to the opening 1 so that the lubricant has direct access to the outer as well as the inner face of each bearing sleeve 4.

Each bearing sleeve 4 is limited against outward axial displacement by a snap ring 7 which is located in a suitable groove formed in the piston 2 and communicating with each opening 1. Inward axial displacement of each bearing sleeve 4 is limited by a cylindrical ring 8 which is located in the space between each bearing sleeve 4 and the bearing sleeve for the connecting rod 9. These rings 8 are freely turnable on the wrist pin 3 and consist of a material harder than that of the bearing sleeve 4 as well as the bearing sleeve of the wrist pin 9 so as to guarantee favorable slipping action. The rings 8 may, for example, be made of steel.

Between each outer end of wrist pin 3 and the ring 7 located adjacent thereto there is provided a sealing disc 10 which prevents lubricant from moving upwardly through the opening 1 from the space about each sleeve 4 as well as from the space between each sleeve 4 and the wrist pin 3, so that lubricant from these spaces cannot have access to the space between the cylindrical wall and the piston 2.

It will be understood that each of the elements described above, or two or more together, may also find a useful application in other types of internal combustion engines differing from the types described above.

While the invention has been illustrated and described as embodied in piston arrangements for internal combustion engines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an internal combustion engine, in combination, a piston having opposed side wall portions each of which, is formed with an opening passing therethrough; a bearing sleeve freely turnably arranged in each of said openings and consisting of a material softer than the material of said piston; a wrist pin extending between said openings and having opposite end portions respectively freely turnably arranged in said freely turnable bearing sleeves; and means for limiting axial displacement of said bearing sleeves with respect to said piston and said wrist pin.

2. In an internal combustion engine, in combination, a piston having opposed side wall portions each of which is formed with an opening passing therethrough; a bearing sleeve freely turnably arranged in each of said openings and consisting of a material softer than the material of said piston; a wrist pin extending between said openings and having opposite end portions respectively freely turnably arranged in said freely turnable bearing sleeves; means for limiting axial displacement of said bearing sleeves with respect to said piston and said wrist pin; lubricant supply means formed in said piston and communicating with said openings thereof for supplying a lubricant to said bearing sleeves; and sealing means located at each end of said wrist pin for preventing lubricant from moving to the exterior of said piston through said openings.

3. In an internal combustion engine, in combination, a piston having opposed side wall portions each of which, is formed with a cylindrical opening passing therethrough; a cylindrical bearing sleeve freely turnably arranged in, each of said openings and consisting of a material softer than the material of said piston; a wrist pin extending between said openings and having opposite end portions respectively freely turnably arranged in said freely turnable bearing sleeves; and means for limiting axial displacement of said bearing sleeves with respect to said piston and said wrist pin.

4. In an internal combustion engine, in combination, a piston having opposed side wall portions each of which, is formed with a cylindrical opening passing therethrough; a cylindrical bearing sleeve freely turnably arranged in, each of said openings and consisting of a material softer than the material of said piston; a wrist pin extending between said openings and having opposite end portions respectively freely turnably arranged in said freely turnable bearing sleeves, said end portions having in said openings of said piston, respectively, lengths which are respectively substantially equal to the lengths of cylindrical bearing sleeves.

5. In an internal combustion engine, in combination, a piston having opposed side wall portions each of which, is formed with an opening passing therethrough; a bearing sleeve freely turnably arranged in each of said openings and consisting of a material softer than the material of said piston; a wrist pin extending between said openings. and having opposite end portions respectively freely turnably arranged in said freely turnable bearing sleeves; a third bearing sleeve turnably engaging and located about said wrist pin between said openings of said piston; a connecting rod located about and turnably engaging said third bearing sleeves; a first ring located about said wrist pin for free turning movement thereon between said third, bearing sleeve and each of said first-mentioned bearing sleeves to limit inward axial movement of said first-mentioned bearing sleeves, said first ring consisting of a material harder than the material of said first or third bearing sleeves; and a second ring located in each of said, openings for limiting outward movement of said first-mentioned bearing sleeves.

6. In an internal combustion engine, in combination, a piston having opposed side wall portions each of which, is formed with an opening passing therethrough; a bearing sleeve freely turnably arranged in each of said openings and consisting of a material softer than the material of said piston; a wrist pin extending between said openings and having opposite end portions respectively freely turnably arranged in said freely turnable bearing sleeves; means for limiting axial displacement of said bearing sleeves with respect to said piston and said wrist pin; a plurality of bores formed in said piston, communicating with each of said openings, and being located in a predetermined plane for feeding a lubricant to said bearing sleeves; and a plurality of apertures formed in each bearing sleeve, being uniformly distributed thereabout, and being located substantially in the same plane as said bores which communicate with the opening in which said bearing sleeve is located.

7. In an internal combustion engine, in combination, a piston having opposed side wall portions each of which is formed with an opening passing therethrough; a bearing sleeve freely turnably arranged in each of said openings and consisting of a material softer than the material of said piston; a wrist pin extending between said openings and having opposite end portions respectively freely turnably arranged in said freely turnable bearing sleeves; means for limiting axial displacement of said bearing sleeves with respect to said piston and said wrist pin; a plurality of bores formed in said piston, communicating with each of said openings, and being located in a predetermined plane for feeding a lubricant to said bearing sleeves; and a plurality of apertures formed in each bearing sleeve, being uniformly distributed thereabout, and being located substantially in the same plane as said bores which communicate with the opening in which said bearing sleeve is located, said apertures being located in a plane which passes substantially centrally through each bearing sleeve.

8. In an internal combustion engine, in combination, a piston having opposed side wall portions each of which is formed with an opening passing therethrough; a bearing sleeve freely turnably arranged in each of said openings and consisting of a material softer than the material of said piston; a wrist pin extending between said openings and having opposite end portions respectively freely turnably arranged in said freely turnable bearing sleeves; a ring located in each opening of said piston for limiting outward axial displacement of the bearing sleeve located in said opening; and a sealing member located between said ring and the end of said wrist pin adjacent thereto to prevent the movement of a lubricant outwardly of said openings.

9. In an internal combustion engine, in combination, a piston having opposed side wall portions each of which is formed with an opening passing therethrough; a bearing sleeve freely turnably arranged in each of said openings and consisting of a material softer than the material of said piston; a wrist pin extending between said openings and having opposite end portions respectively freely turnably arranged in said freely turnable bearing sleeves; a ring located in each opening of said piston for limiting outward axial displacement of the bearing sleeve located in said opening; and a substantially flat sealing disc located between said ring and the end of said wrist pin adjacent thereto to prevent the movement of a lubricant outwardly of said openings.

10. In an internal combustion engine, in combination, a piston having opposed side wall portions each of which is formed with an opening passing therethrough; a bearing sleeve freely turnably arranged in each of said openings and consisting of a material softer than the material of said piston; a wrist pin extending between said openings and having opposite end portions respectively freely turnably arranged in said freely turnable bearing sleeves; a ring located in each opening of said piston for limiting outward axial displacement of the bearing sleeve located in said opening; a sealing member located between said ring and the end of said wrist pin adjacent thereto to prevent the movement of a lubricant outwardly of said openings; and lubricant supply means formed in said piston and communicating with said openings thereof for supplying a lubricant to said bearing sleeves.

References Cited in the file of this patent

UNITED STATES PATENTS

| | | |
|---|---|---|
| 1,554,475 | Wendell et al. | Sept. 22, 1925 |
| 1,637,247 | Snyder | July 26, 1927 |

FOREIGN PATENTS

| | | |
|---|---|---|
| 406,516 | Great Britain | Mar. 1, 1934 |